United States Patent
Seo et al.

(10) Patent No.: US 10,002,712 B2
(45) Date of Patent: Jun. 19, 2018

(54) MULTI-LAYER CAPACITOR PACKAGE AND PACKAGE HOUSING

(71) Applicant: RESEARCH & BUSINESS FOUNDATION SUNGKYUNKWAN UNIVERSITY, Suwon-si (KR)

(72) Inventors: Su-Jeong Seo, Suwon-si (KR); Tae-Yoo Kim, Suwon-si (KR); Jung-Kab Park, Suwon-si (KR); Young-Il Song, Suwon-si (KR); Jin-Ha Shin, Siheung-si (KR); Jungwoo Lee, Suwon-si (KR); Younglae Cho, Suwon-si (KR); Byung-Wook Ahn, Suwon-si (KR); Jung-Ho Park, Seoul (KR); Sook-Young Yun, Seongnam-si (KR); Seung-Bin Baeg, Suwon-si (KR); Young-il Na, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 16 days.

(21) Appl. No.: 15/063,753

(22) Filed: Mar. 8, 2016

(65) Prior Publication Data

US 2016/0300663 A1    Oct. 13, 2016

(30) Foreign Application Priority Data

Mar. 9, 2015  (KR) .................. 10-2015-0032473

(51) Int. Cl.
*H01G 4/30* (2006.01)
*H01G 4/224* (2006.01)
(Continued)

(52) U.S. Cl.
CPC .............. *H01G 4/30* (2013.01); *H01G 4/012* (2013.01); *H01G 4/224* (2013.01); *H01G 4/232* (2013.01)

(58) Field of Classification Search
CPC ............ H01G 4/30; H01G 4/224; H01G 4/13; H01G 4/248; H01G 4/1227; H01G 4/2325; H01H 4/005
See application file for complete search history.

(56) References Cited

U.S. PATENT DOCUMENTS

2011/0102966 A1* 5/2011 Takeoka .................. H01G 2/08
                                                             361/301.3
2011/0244317 A1* 10/2011 Lee ..................... H01M 2/0473
                                                             429/182
(Continued)

FOREIGN PATENT DOCUMENTS

KR       10-0773198       11/2007
KR    10-2011-0139464 A   12/2011

OTHER PUBLICATIONS

Korean Office action dated Aug. 26, 2016 in corresponding Korean Patent Application No. 10-2015-0032473 (4 pages in Korean).

*Primary Examiner* — Nguyen Ha
(74) *Attorney, Agent, or Firm* — NSIP Law (57) ABSTRACT

Disclosed is a multi-layer capacitor package comprising: a multi-layer capacitor; connection electrodes coupled to capacitor electrodes respectively, wherein the connection electrodes in each group of the connection electrodes vertically overlap with each other, and first and second groups of the connection electrodes are horizontally spaced from each other; a package housing configured to receive therein the multi-layer capacitor; and first and second internal electrodes received in the housing to be coupled to the first
(Continued)

and second groups of the connection electrodes respectively, wherein the first and second internal electrodes are horizontally spaced from each other.

9 Claims, 10 Drawing Sheets

(51) Int. Cl.
*H01G 4/012* (2006.01)
*H01G 4/232* (2006.01)

(56) References Cited

U.S. PATENT DOCUMENTS

| 2012/0055909 | A1* | 3/2012 | Miyake | B21K 25/00 |
| | | | | 219/121.64 |
| 2013/0094122 | A1* | 4/2013 | Domes | H05K 7/1432 |
| | | | | 361/321.1 |
| 2013/0250475 | A1* | 9/2013 | Mori | H01G 9/008 |
| | | | | 361/301.5 |
| 2015/0187502 | A1* | 7/2015 | Hwang | H01G 4/38 |
| | | | | 361/679.01 |

* cited by examiner

MULTI-LAYER CAPACITOR PACKAGE AND PACKAGE HOUSING

CROSS-REFERENCE TO RELATED APPLICATION

This application claims the benefit of Korea Patent Application No. 10-2015-0032473 filed on Mar. 9, 2015, the entire content of which is incorporated herein by reference for all purposes as if fully set forth herein.

BACKGROUND

Field of the Present Disclosure

The present disclosure relates to a multi-layer capacitor package and a housing thereof, and, more particularly, to a multi-layer capacitor package where a multi-layer capacitor with a high level capacitance and stable structure is packaged in a package housing, and to a housing thereof.

Discussion of the Related Art

The capacitor includes, in a simplest form, two electrodes and a dielectric layer therebetween. When a voltage is applied to the capacitor, a positive charge is induced at one electrode and a negative charge is induced at the other electrode. Thus, electrical attraction may be generated therebetween. The positive and negative charges are accumulated to reserve energy. Recently, a single capacitor may include at least three vertical alterations of electrodes and dielectric layers. This may be referred to as a multi-layer capacitor which is used on demand of a smaller device or high-power device.

The multi-layer capacitor may have parallel connections of the electrodes. In order to apply the voltage thereto, it is necessary that the areas of the electrodes decrease from a bottom silicon substrate to a top portion of the capacitor. That is, this area decrease may cause a lowered efficiency of the multi-layer capacitor. In this configuration, formation of the external terminals to allow the parallel connections of the electrodes may lead to damage of the bottom electrode due to an external force.

SUMMARY

Form considerations of the above situations, the present disclosure provides a multi-layer capacitor package to secure the maximum areas of the capacitor electrodes and to allow reliable voltage supply from an outside source, and to allow reliable coupling with an external terminal.

Further, the present disclosure provides a package housing to reliably package a multi-layer capacitor.

In an aspect of the present disclosure, there is provided a multi-layer capacitor package comprising: a multi-layer capacitor comprising at least two vertical alterations of capacitor electrodes and dielectric layers on the base substrate, the capacitor electrodes having substantially the same area; connection electrodes coupled to the capacitor electrodes respectively and extending from the capacitor electrodes respectively, wherein the connection electrodes are divided into at least two groups of the connection electrodes including first and second groups, wherein the connection electrodes in each group vertically overlap with each other, and the first and second groups are horizontally spaced from each other; a package housing configured to receive therein the multi-layer capacitor, wherein the package housing comprises a bottom portion and side portions coupled to the bottom portion; and first and second internal electrodes received in the housing to be coupled to the first and second groups of the connection electrodes respectively, wherein the first and second internal electrodes are horizontally spaced from each other.

In one embodiment, the package further comprises a first through-electrode passing through the first group of the connection electrodes, the first through-electrode having a bottom portion contacting the first internal electrode; and a second through-electrode passing through the second group of the connection electrodes, the second through-electrode having a bottom portion contacting the second internal electrode.

In one embodiment, the connection electrodes in the first group of connection electrodes are insulated from each other via an insulating layer therebetween, and the connection electrodes in the second group of connection electrodes are insulated from each other via the insulating layer therebetween.

In one embodiment, each of the first internal electrode and the second internal electrode extends on and along a bottom portion of the package housing.

In one embodiment, each of the connection electrodes has an exposed outer side face, wherein the exposed outer side faces of the connection electrodes face the same inner side face of the package housing.

In one embodiment, the first internal electrode includes: a first electrode portion contacting the exposed side face of the connection electrodes of the first group and extending on and along the side portion of the package housing; and a second electrode portion coupled to the first electrode portion, and extending on and along the bottom portion of the package housing, wherein the second internal electrode includes: a third electrode portion contacting the exposed side face of the connection electrodes of the second group and extending on and along the side portion of the package housing; and a fourth electrode portion coupled to the third electrode portion, and extending on and along the bottom portion of the package housing.

In one embodiment, the package further comprises: a first external terminal coupled to the first internal electrode and passing through the bottom portion of the package housing outside of the housing; and a second external terminal coupled to the second internal electrode and passing through the bottom portion of the package housing outside of the housing.

In one embodiment, each of the dielectric layers has an upper surface portion having pores formed therein, and each connection electrode is horizontally coupled to a corresponding capacitor electrode and to a dielectric layer immediately on the corresponding capacitor electrode.

In an aspect of the present disclosure, there is provided a package housing for a multi-layer capacitor, the housing comprising: a bottom portion; side portions coupled to the bottom portion to define an inner space together with the bottom portion; a first internal electrode formed in the inner space to contact the multi-layer capacitor; and a second internal electrode formed in the inner space to contact the multi-layer capacitor, wherein the first internal electrode is spaced from the second internal electrode.

In one embodiment, each of the first internal electrode and the second internal electrode extends on and along the bottom portion.

In one embodiment, each of the first internal electrode and the second internal electrode comprises: a first electrode portion extending on and along the bottom portion; and a second electrode portion coupled to the first electrode portion, the second electrode portion extending on and along the side portion.

In accordance the present disclosure, the connection electrodes extending from the capacitor electrodes are formed in a surrounding region around the capacitor region and the connection electrodes may be securely coupled to the external terminal. It may lead to the multi-layer capacitor package to secure the maximum areas of the capacitor electrodes and to allow reliable voltage supply from an outside source.

BRIEF DESCRIPTIONS OF THE DRAWINGS

The accompanying drawings included to provide a further understanding of the present disclosure illustrate embodiments of the present disclosure.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, embodiments of the present disclosure will be described in details with reference to attached drawings.

Figure 1:
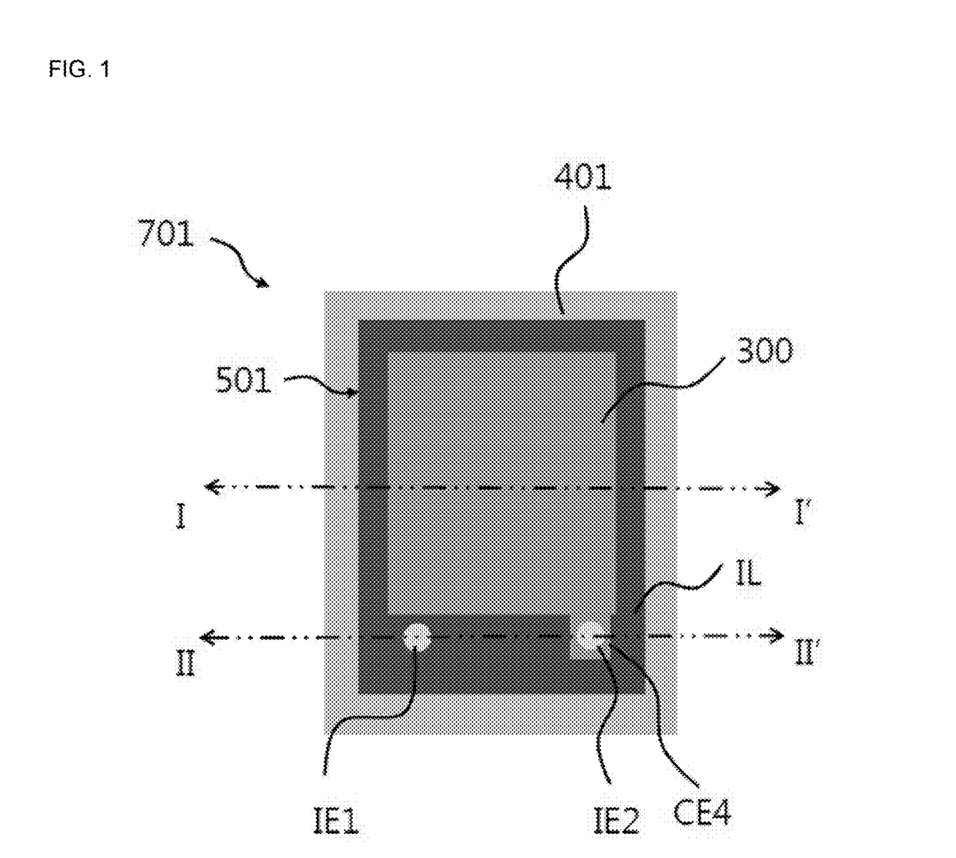
FIG. 1 shows a top view of a multi-layer capacitor package in accordance with one embodiment of the present disclosure.

FIG. 1 shows a top view of a multi-layer capacitor package in accordance with one embodiment of the present disclosure.

Referring to FIG. 1, a multi-layer capacitor package 701 may include a package housing 401 and a multi-layer capacitor 501 disposed therein.

Figure 2A:
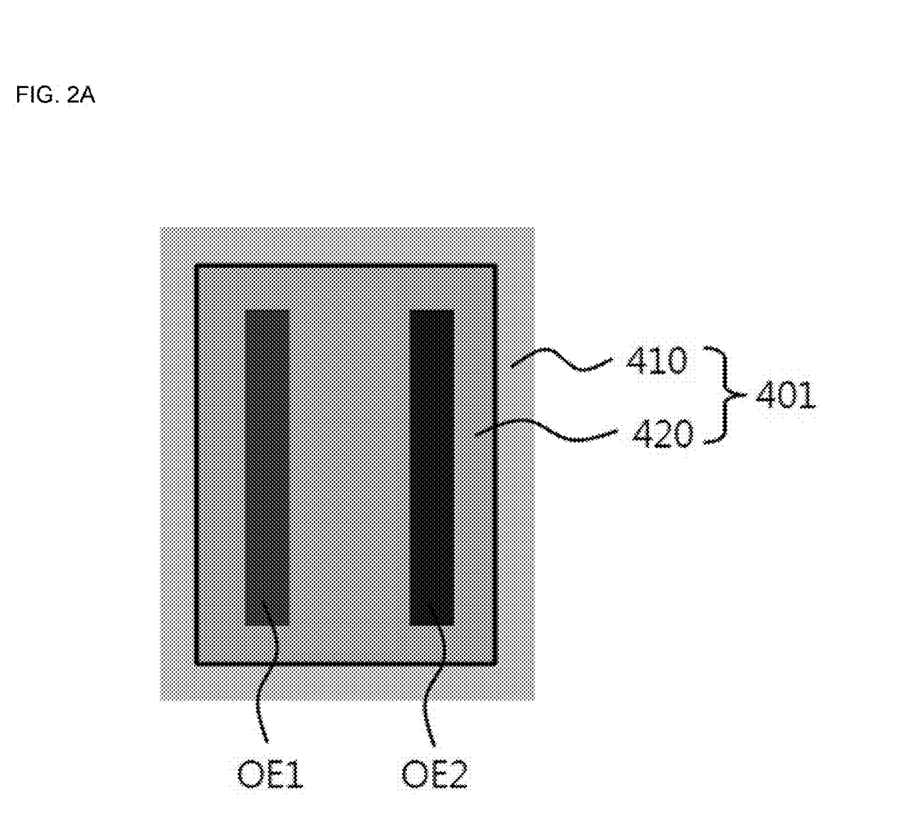
FIG. 2A shows a top view of a capacitor housing in FIG. 1.
Figure 2B:
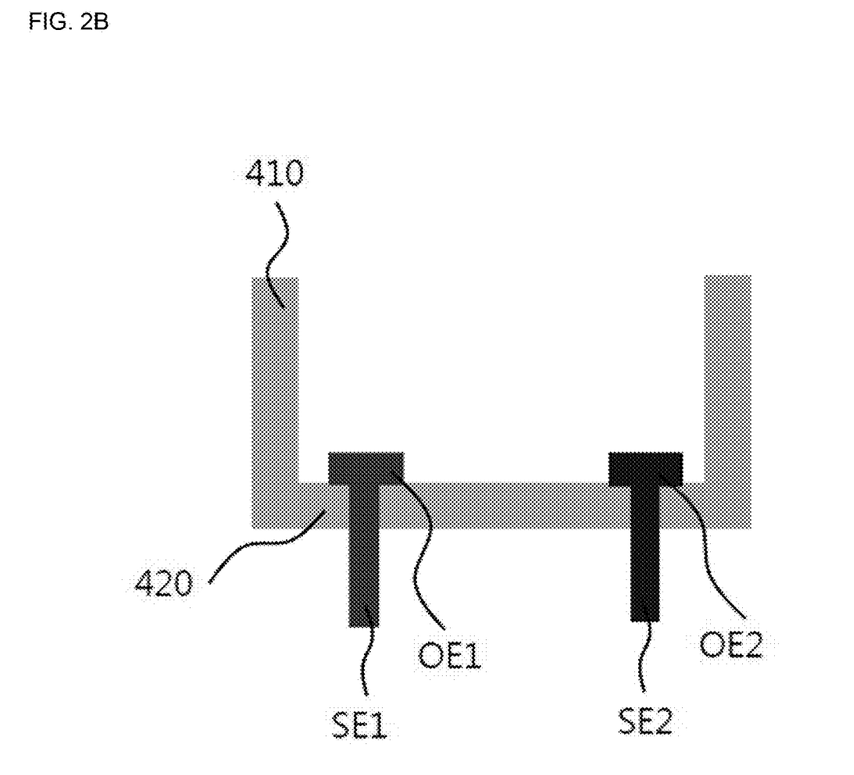
FIG. 2B shows a cross-sectional view of FIG. 2A.

The multi-layer capacitor 501 may be electrically coupled to internal electrodes OE1, OE2 of the package housing 401 via first and second through-electrodes IE1, IE2 (FIG. 2A and FIG. 2B). The internal electrodes OE1, OE2 of the package housing 401 may be electrically coupled to external terminals SE1, SE2 respectively (FIG. 2A and FIG. 2B). Thus, the multi-layer capacitor 501 may receive a supply voltage from an external power supply.

Referring to FIG. 2A and FIG. 2B along with FIG. 1, the package housing 401 will be described. Then, referring to FIG. 3 along with FIG. 1, the multi-layer capacitor 501 will be described.

FIG. 2A shows a top view of a capacitor housing in FIG. 1. FIG. 2B shows a cross-sectional view of FIG. 2A.

FIG. 2B shows a cross-sectional view taken along substantially the same line in FIG. 2A as a I-I' line in FIG. 1. Referring to FIG. 2A and FIG. 2B, the capacitor housing 401 may include side portions 410 to surround an outer side face of the multi-layer capacitor 501, a bottom portion 420 coupled to the side portions 410 to face a bottom face of the multi-layer capacitor 501, and the first internal electrode OE1 and the second internal electrode OE2.

The connection between the side portions 410 and bottom portion 420 may define an inner space formed therein. In the inner space, the multi-layer capacitor 501 may be received. On the bottom portion 420, a pair of the first and second internal electrodes OE1, OE2 may be disposed to be spaced from each other. The first internal electrode OE1 may be coupled to the first external terminal SE1 which may pass through the bottom portion 420 outwardly. Further, the second internal electrode OE2 may be coupled to the second external terminal SE2 which may pass through the bottom portion 420 outwardly. To the first and second external terminals SE1, SE2, voltages having opposite polarities may be applied respectively.

The first internal electrode OE1 and the second internal electrode OE2 may be formed in the capacitor housing 401 using an electrolyte plating or electroless plating.

Figure 3:
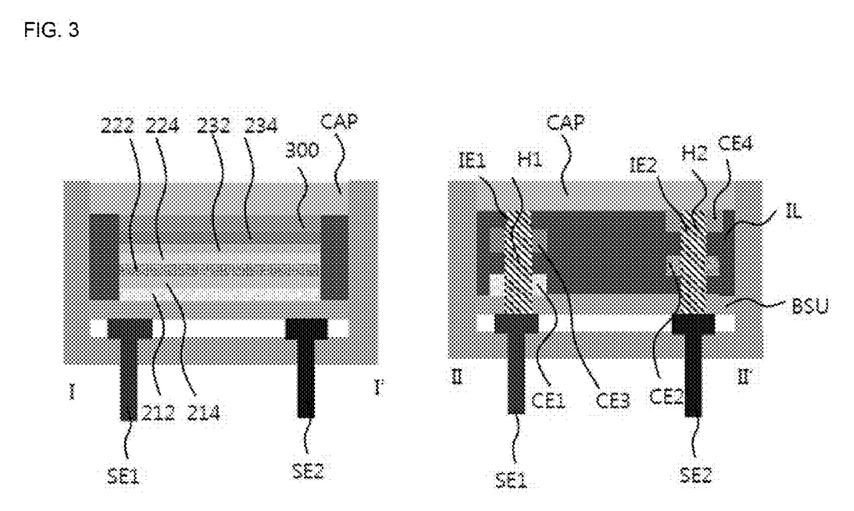
FIG. 3 shows a cross-sectional view taken along a I-I' line and II-II' line in FIG. 1

The first internal electrode OE1 may extend over the bottom portion 420 in a first direction. The second internal electrode OE2 may extend over the bottom portion 420 in the first direction. The second internal electrode OE2 may be spaced from the first internal electrode OE1 as shown in FIG. 2A. The first internal electrode OE1 may electrically contact the first through-electrode IE1 of the multi-layer capacitor 501 (FIG. 3). The second internal electrode OE2 may electrically contact the second through-electrode IE2 of the multi-layer capacitor 501 (FIG. 3). The multi-layer capacitor 501 electrically coupled via first and second through-electrodes IE1, IE2 to the first and second internal electrodes OE1, OE2 will be described with reference to FIG. 3 along with FIG. 1.

FIG. 3 shows a cross-sectional view taken along a I-I' line and II-II' line in FIG. 1.

Referring to FIG. 3 along with FIG. 1, the multi-layer capacitor 501 may include a base substrate BSU, first, second and third capacitor electrodes 212, 222, 232, first, second and third dielectric layers 214, 224, 234, a fourth capacitor electrode 300, and first to fourth connection electrodes CE1, CE2, CE3, CE4. The multi-layer capacitor 501 may be received in the inner space of the capacitor housing 401. A securing member CAP may be disposed on a top of the multi-layer capacitor 501 to reliably secure the multi-layer capacitor 501 in the capacitor housing 401.

In FIG. 3, regions of the first, second and third capacitor electrodes 212, 222, 232 may be collectively referred to as a "capacitor region". Regions of the first to fourth connection electrodes CE1, CE2, CE3, CE4 and regions of the first and second through-electrodes IE1, IE2 may be collectively referred to as an "electrode region" which is adjacent to the capacitor region.

The base substrate BSU may be embodied as a silicon wafer. In this connection, on the silicon wafer, a silica layer may be formed. On the silica layer, the first capacitor electrode 212 may be formed. On the silica layer, a titanium layer may be formed to enhance coupling between the base substrate BSU and the first capacitor electrode 212. The base substrate BSU may be formed on the first and second internal electrodes OE1, OE2. That is, between the base substrate BSU and the bottom portion 420 of the package housing 401, the first and second internal electrodes OE1, OE2 may be disposed.

The first capacitor electrode 212 may be embodied, for example, as an aluminum electrode. The aluminum electrode may be made of pure aluminum or an aluminum alloy partially containing at least one other compositions than the aluminum. The first capacitor electrode 212 may be formed on the capacitor region of the base substrate BSU.

The first dielectric layer 214 may be formed on the first capacitor electrode 212. The first dielectric layer 214 may entirely cover the first capacitor electrode 212. Actually, the first dielectric layer 214 may be integrated with the first capacitor electrode 212. For this, the first dielectric layer 214 may be made of an aluminum oxide resulting from partially anodizing of the first capacitor electrode 212 made of the aluminum. That is, when the aluminum layer surface is subjected to the anodization, the aluminum layer may be partially oxidized, to form the aluminum oxide, which may act as the first dielectric layer 214, while the non-oxidized portion may act as the first capacitor electrode 212.

The first connection electrode CE1 may be coupled to the first capacitor electrode 212. The first connection electrode CE1 may be disposed in the electrode region adjacent to the first capacitor electrode 212. The first connection electrode CE1 may extend from the first capacitor electrode 212 in a line form. The first connection electrode CE1 may be made of the same metal as the first capacitor electrode 212. The first connection electrode CE1 may have a lower portion coupled to the first capacitor electrode 212 and may have an upper portion coupled to the first dielectric layer 214. Thus, a total thickness of the first connection electrode CE1 may be substantially equal to a sum of a thickness of the first capacitor electrode 212 and a thickness of the first dielectric layer 214.

The second capacitor electrode 222 may be disposed on the first dielectric layer 214, may be embodied as an aluminum electrode. The second dielectric layer 224 may be disposed on the second capacitor electrode 222 and may be made of an aluminum oxide. The second connection electrode CE2 may be coupled to the second capacitor electrode 222. The second connection electrode CE2 may extend from the second capacitor electrode 222, for example, in a line form and may be disposed on the electrode region. The second connection electrode CE2 may be horizontally and vertically spaced from the first connection electrode CE1. The second connection electrode CE2 may be made of the same metal as the second capacitor electrode 222 and may be coupled to the second dielectric layer 224. That is, the second connection electrode CE2 may have a lower portion horizontally coupled to the second capacitor electrode 222 and an upper portion horizontally coupled to the second dielectric layer 224.

The third capacitor electrode 232 may be disposed on the second dielectric layer 224 and may be an aluminum electrode. The third dielectric layer 234 may be disposed on the third capacitor electrode 232, and may be made of an aluminum oxide. The third connection electrode CE3 may be coupled to the third capacitor electrode 232 and may be electrically insulated from the first capacitor electrode 212.

The third connection electrode CE3 may be made of the same metal as the third capacitor electrode 232, and may be coupled to the third dielectric layer 234. That is, the third connection electrode CE3 may have a lower portion horizontally coupled to the third capacitor electrode 232 and have an upper portion horizontally coupled to the third dielectric layer 234. The third connection electrode CE3 may vertically overlap the first connection electrode CE1. The third connection electrode CE3 may be insulated from the first connection electrode CE1 via an insulating layer IL disposed therebetween. The third connection electrode CE3 and the first connection electrode CE1 may jointly form the first group of connection electrodes which may receive a voltage having a first polarity.

The fourth capacitor electrode 300 may be disposed on the third dielectric layer 234, and may include an aluminum electrode. The fourth capacitor electrode 300 may be an uppermost electrode of the multi-layer capacitor 501. The fourth capacitor electrode 300 may have substantially the same configuration as the first capacitor electrode 212 except for a location thereof.

The fourth connection electrode CE4 may be coupled to the fourth capacitor electrode 300 may vertically overlap the second connection electrode CE2. The fourth connection electrode CE4 may extend from the fourth capacitor electrode 300. The fourth connection electrode CE4 may be disposed in the electrode region. The fourth connection electrode CE4 may be insulated from the second connection electrode CE2 via the insulating layer IL disposed therebetween. The fourth connection electrode CE4 and the second connection electrode CE2 may jointly form the second group of connection electrodes which may receive a voltage having a second polarity opposite the first polarity applied to the first group of connection electrodes.

In this way, the first connection electrode CE1 and third connection electrode CE3 may vertically overlap with each other to form the first group of connection electrodes. The second connection electrode CE2 and fourth connection electrode CE4 may vertically overlap with each other to form the second group of connection electrodes. Further, the first and third connection electrodes CE1, CE3 may be horizontally spaced from the second and fourth connection electrodes CE2, CE4 at a predetermined distance. That is, the first group of connection electrodes CE1, CE3 may be horizontally spaced from the second group of connection electrodes CE2, CE4 as shown in the cross-sectional view.

The first and third connection electrodes CE1, CE3 may be commonly passed through by the first hole H1. The second and fourth connection electrodes CE2, CE4 may be commonly passed through by the second hole H2. In the first hole H1, the first through-electrode IE1 may be defined, while in the second hole H2, the second through-electrode IE2 may be defined. The first through-electrode IE1 may contact the first internal electrode OE1 while the second through-electrode IE2 may contact the second internal electrode OE2.

Except for the electrode region, the insulating layer IL may be formed. At least one of the first to fourth connection electrodes CE1, CE2, CE3, CE4 may be formed on the insulating layer IL. The insulating layer IL may partially cover the electrode region. The insulating layer IL may cover an edge of the electrode region. At the same time, the insulating layer IL may be disposed between the first connection electrode CE1 and third connection electrode CE3, and between the second connection electrode CE2 and fourth connection electrode CE4. The insulating layer IL may be made of a stack of multiple insulating layers FL, SL, TL, FOL (FIG. 4 to FIG. 7).

Since, after formation of the first capacitor electrode 212, the second connection electrode CE2 is formed, a step relative to the base substrate BSU may be created. Further, since, after formation of the second capacitor electrode 222 and the second dielectric layer 224, the third connection electrode CE3 is formed, the step relative to the base substrate BSU may be further increase. When the fourth, fifth, etc. capacitor electrodes are further formed, the step relative to the base substrate BSU may be still further increase. In this way, during the formation of the connection electrodes, the electrodes may have a discontinuity. However, for the multi-layer capacitor in accordance with the present disclosure, the connection electrodes CE1, CE2, CE3, CE4 coupled to the capacitor electrodes 212, 222, 232, 300 may be divided into at least two groups which may be disposed in a staggering manner. This may lead to a minimization of the step during the formation of the connection electrodes. This may lead to reliable parallel connection thereof.

Each of the first, second and third capacitor electrodes 212, 222, 232 and fourth capacitor electrode 300 may have flat and smooth bottom and top faces. Each of the first dielectric layer 214, the second dielectric layer 224 and third dielectric layer 234 may have a smooth bottom face but have an upper surface portion having multiple pores formed therein.

Specifically, the first dielectric layer 214 may have multiple pores formed therein open toward the second capacitor electrode 222. The second dielectric layer 224 may have multiple pores formed therein open toward the third capacitor electrode 232. The third dielectric layer 234 may have multiple pores formed therein open toward the fourth capacitor electrode 300. Each of the first to third dielectric layers 214, 224, 234 may have a pore containing layer having pores formed therein due to the anodization of the aluminum layer, and a compact layer having more compact than the pore layer. In one example, twice anodization may be carried out for the aluminum layer. Thus, the compact layer may have increased thickness and may be disposed beneath the pore containing layer. In this connection, a thickness of the compact layer may be larger than that of the pore containing layer. The pore containing layer may absorb an external shock. Thus, this may lead to a minimized brittleness of the first to third dielectric layers 214, 224, 234.

Otherwise, via a single time anodization, the pore layer formed in each of the first to third dielectric layers 214, 224, 234 may have a depressed bottom portion.

FIG. 4 to FIG. 7 show cross-sectional views for describing a method of manufacturing a multi-layer capacitor in FIG. 1.

Figure 4:
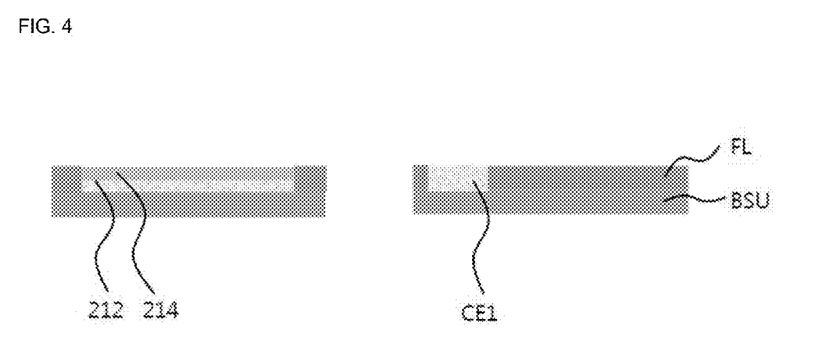
FIG. 4 to FIG. 7 show cross-sectional views for describing a method of manufacturing a multi-layer capacitor in FIG. 1.

FIG. 4 shows a cross-sectional view for describing an operation for forming a first insulating layer FL, the first capacitor electrode 212, the first dielectric layer 214 and the first connection electrode CE1.

Referring to FIG. 4, first, on the base substrate BSU, the first insulating layer FL may be formed. The first insulating layer FL may be formed in a neighboring region with the capacitor region except the region of the first connection electrode CE1.

Then, on the base substrate BSU having the first insulating layer

FL formed thereon, a patterned aluminum layer may be formed. For this, a mask having a first opening exposing the capacitor region and a second opening exposing a portion of the electrode region, that is, the region of the first connection electrode CE1 may be disposed on the base substrate BSU. Then, the aluminum may be deposited thereon to fill only the first and second openings to form a patterned aluminum layer. Thus, in the capacitor region, a first electrode layer is formed, and, in the electrode region, the first connection electrode CE1 may be formed. The first electrode layer and the first connection electrode CE1 may be formed except for the region of the first insulating layer FL.

After formation of the first electrode layer and the first connection electrode CE1, in a boundary between the first electrode layer and the first connection electrode CE1, a masking resin may be applied. The masking resin may act to electrically insulate between the first electrode layer and the first connection electrode CE1. One example thereof may include polyimide (PI).

Thereafter, the base substrate BSU having the applied masking resin may be immersed in a bath containing an electrolyte liquid and may be subjected to voltage application to perform anodization of the first electrode layer. Based on the masking resin, the first electrode layer may be immersed in the bath, but the first connection electrode CE1 may not be immersed. Thus, only the first electrode layer may be subjected to anodization, while the first connection electrode CE1 may be kept as it is. Via the anodization of the first electrode layer, the first electrode may have a surface portion turning into the first dielectric layer 214, while the rest of the first electrode layer may act as the first capacitor electrode 212.

In one example, the first capacitor electrode 212 and the first dielectric layer 214 may be formed via twice anodization. This twice anodization may include first and second anodization operations which may use different electrolyte liquids. In the first anodization, a first electrolyte liquid containing sulfuric acid, phosphoric acid, oxalic acid, etc. may be employed. In the second anodization, a second electrolyte liquid containing boric acid, citric acid and the like may be employed. In the first anodization, a primary pore containing layer and a primary compact layer may be formed. In the second anodization, the primary compact layer may turn into a secondary compact layer with an increased thickness, and the primary pore containing layer may turn into a secondary pore containing layer with a smaller pore. Actually, the secondary compact layer and the secondary pore containing layer may correspond to a lower portion of the dielectric layer 120. The secondary compact layer with an increased thickness may allow reduced brittleness of the first dielectric layer 214.

Figure 5:
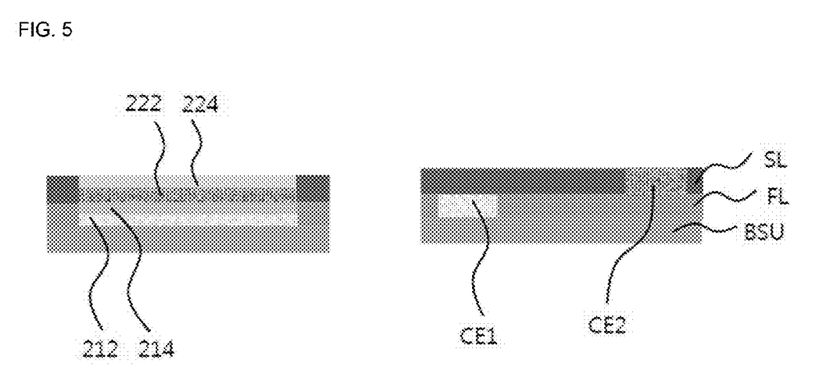

FIG. 5 shows a cross-sectional view for describing an operation for forming a second insulating layer SL, the second capacitor electrode 222, the second dielectric layer 224 and the second connection electrode CE2.

Referring to FIG. 5, on base substrate BSU having the first dielectric layer 214 formed thereon, the second insulating layer SL may be formed. Then, using aluminum, a second electrode layer and the second connection electrode CE2 coupled to the second electrode layer may be formed.

The second insulating layer SL may be formed in the electrode region except for the region of the second connection electrode CE2. The second insulating layer SL may cover the first connection electrode CE1 while the first dielectric layer 214 may be exposed. Further, the second insulating layer SL may not cover the region of the second connection electrode CE2 in the region of the first insulating layer FL.

The second electrode layer and the second connection electrode

CE2 may be formed using a mask having a first opening exposing the capacitor region, and a second opening exposing a portion of the electrode region, that is, the region of the second connection electrode. Then, between the second electrode layer and the second connection electrode CE2, a masking resin may be applied, and then anodization may be executed. In this connection, using the masking resin, the second connection electrode CE2 may be protected from the electrolyte liquid during the anodization of the second electrode layer. In this way, the second connection electrode CE2 may be kept as it is even after the second capacitor electrode 222 and the second dielectric layer 224 are formed.

Figure 6:
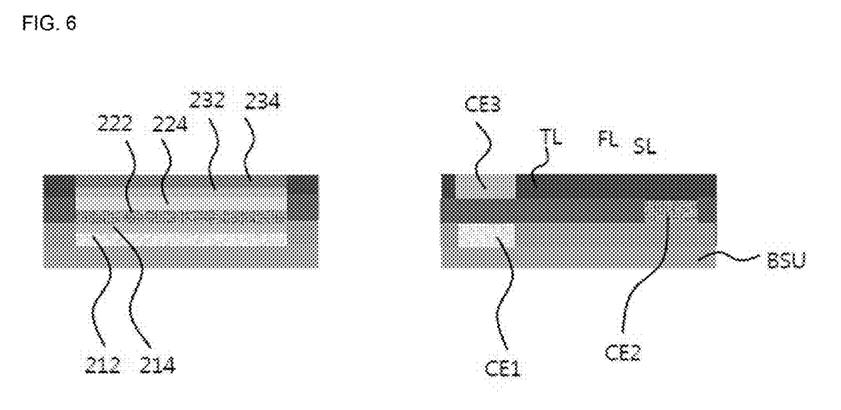

FIG. 6 shows a cross-sectional view for describing an operation for forming a third insulating layer TL, third capacitor electrode 232, third dielectric layer 234 and third connection electrode CE3.

Referring to FIG. 6, the third insulating layer TL may be formed in the electrode region except for the capacitor region and the region of the first connection electrode CE1. Thereafter, a third electrode layer and third connection electrode CE3 may be formed. Then, the third electrode layer may be subjected to anodization to form the third capacitor electrode 232 and third dielectric layer 234. The related process may be substantially the same as described with reference to FIG. 4.

Figure 7:
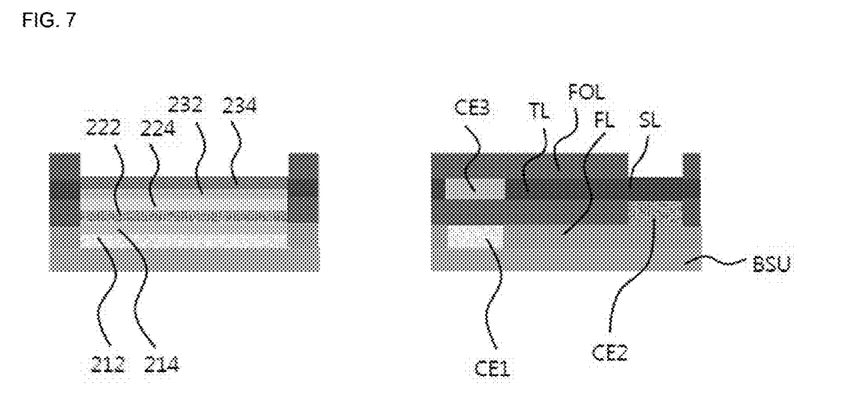

FIG. 7 shows a cross-sectional view for describing an operation for forming a fourth insulating layer FOL, fourth capacitor electrode 300 and fourth connection electrode CE4.

Referring to FIG. 7, a fourth insulating layer FOL may be formed in the electrode region except for the capacitor region and the region of the second connection electrode CE2. Thereafter, the fourth capacitor electrode 300 and fourth connection electrode CE4 may be formed. The related process may be substantially the same as described with reference to FIG. 4.

After forming the fourth capacitor electrode 300 and fourth connection electrode CE4, the first hole H1 and the second hole H2 as shown in FIG. 3 may be formed.

The resulting multi-layer capacitor 501 may be placed into the package housing 401 having the first and second internal electrodes OE1, OE2.

Next, each of the first and second holes H1, H2 may be filled with an electrode material to form the first and second through-electrodes IE1, IE2. In this way, the first through-electrode IE1 may contact the first internal electrode OE1 while the second internal electrode OE2 may contact the second through-electrode IE2. The first internal electrode OE1 and the second internal electrode OE2 may be coupled to the first and second external terminals SE1, SE2 respectively.

On the top of the multi-layer capacitor 501, the securing member CAP may be disposed to firmly secure the multi-layer capacitor 501 in the package housing 401.

As described above, the multi-layer capacitor 501 may be inserted into the package housing 401 and then in the first and second holes H1, H2, the first and second through-electrodes IE1, IE2 may be formed respectively, which may be electrically coupled to the first and second external terminals SE1, SE2 respectively. Then, the securing member CAP may be disposed to firmly secure the multi-layer capacitor 501 in the package housing 401. The resulting multi-layer capacitor package 701 may be easily assembled and have a reliable structure.

Figure 8:
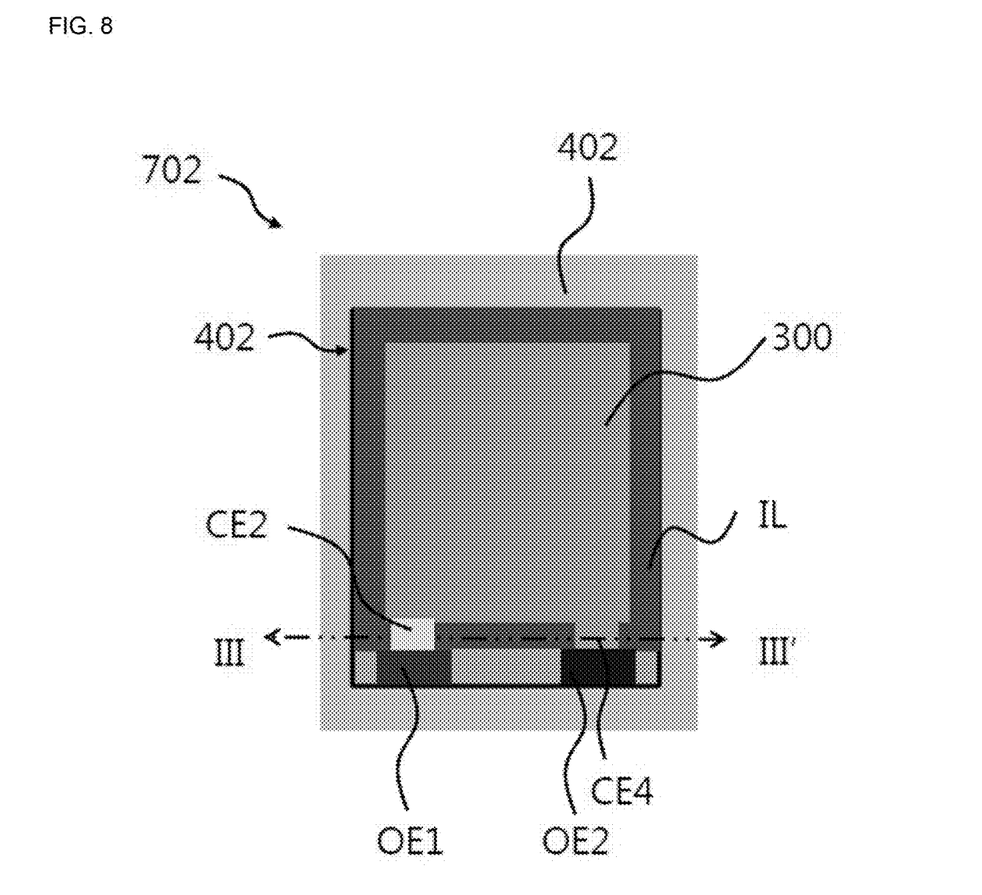
FIG. 8 shows a top view of a multi-layer capacitor package in accordance with another embodiment of the present disclosure.
Figure 9:
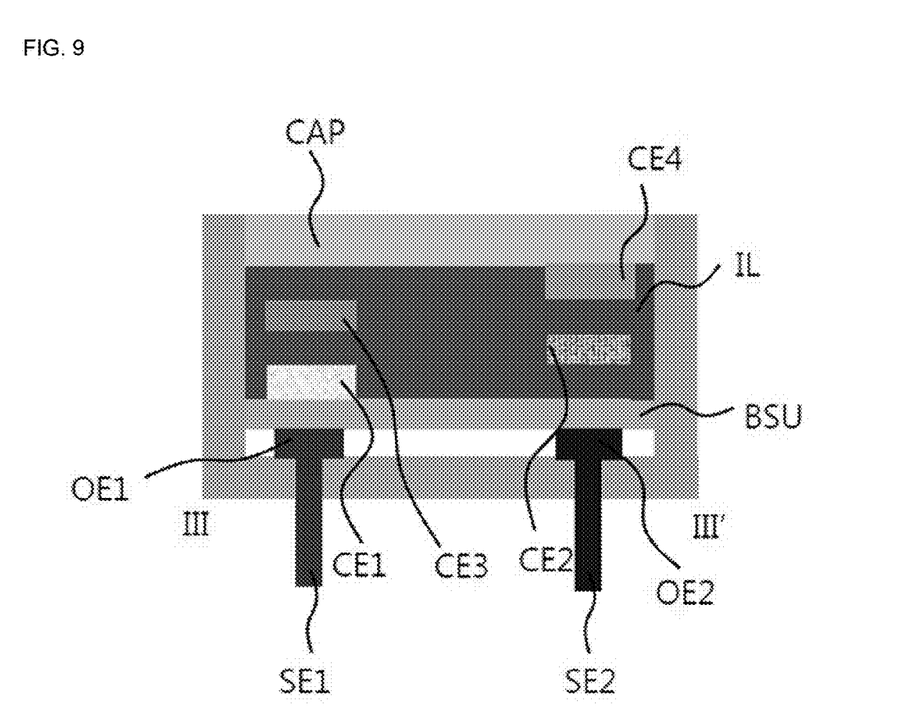
FIG. 9 shows a cross-sectional view taken along a III-III' line in FIG. 8.

FIG. 8 shows a top view of a multi-layer capacitor package in accordance with another embodiment of the present disclosure. FIG. 9 shows a cross-sectional view taken along a III-III' line in FIG. 8.

Referring to FIG. 8 and FIG. 9, a multi-layer capacitor package 702 may include a package housing 402 and a multi-layer capacitor 502. The multi-layer capacitor 502 as shown in FIG. 8 and FIG. 9 may have the same configuration as the multi-layer capacitor 501 as described with reference to FIG. 1 and FIG. 3 except for a connection between the package housing 402 and the multi-layer capacitor 502 and a configuration of a surrounding portion (including connection electrodes) around the multi-layer capacitor 502.

Specifically, each of the first to fourth connection electrodes CE1, CE2, CE3, CE4 of the multi-layer capacitor 502 may have an exposed side face without the housing 402. This may allow the first to fourth connection electrodes CE1, CE2, CE3, CE4 to be directly electrically coupled to the first and second internal electrodes OE1, OE2 in the package housing 402 and then to the first and second external terminals SE1, SE2. Thus, the multi-layer capacitor 502 may dispense with the through-electrodes. Thus, the formation of the holes passing through the first to fourth connection electrodes CE1, CE2, CE3, CE4 may not be required. This may lead to a simple manufacturing process of the multi-layer capacitor.

The above configuration that each of the first to fourth connection electrodes CE1, CE2, CE3, CE4 of the multi-layer capacitor 502 has an exposed side face without the housing 402 may be achieved by forming the first to fourth connection electrodes CE1, CE2, CE3, CE4, and removing the insulating layer IL in the electrode region and between the electrode region and an edge of the base substrate BSU adjacent to the electrode region to expose an edge of each of the first to fourth connection electrodes CE1, CE2, CE3, CE4.

The multi-layer capacitor package 702 may further include the securing member CAP to firmly secure the multi-layer capacitor 502 in the package housing 402.

Figure 10:
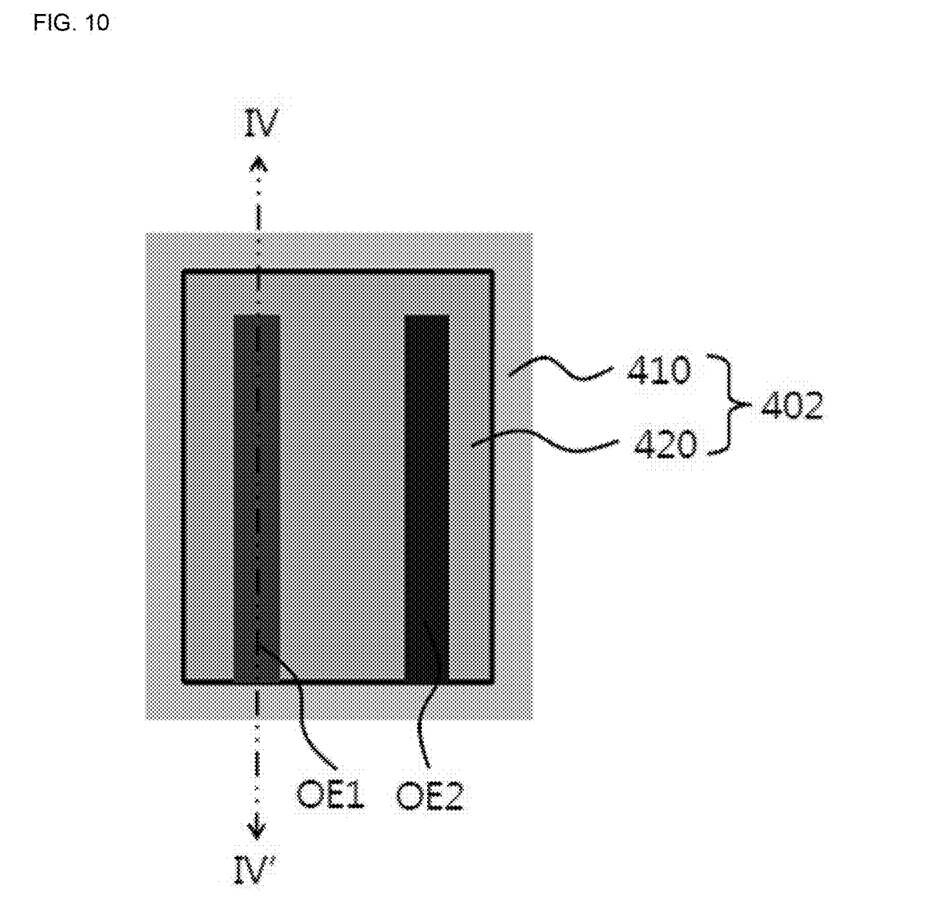
FIG. 10 shows a top view of a capacitor housing in FIG. 8.
Figure 11:
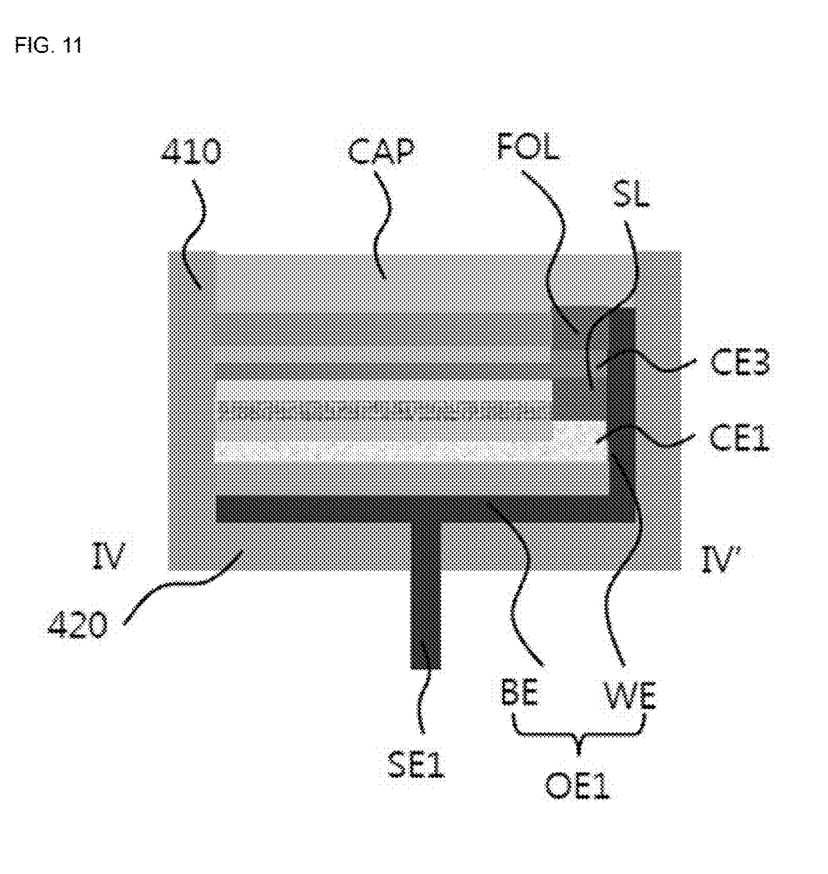
FIG. 11 shows a cross-sectional view taken along a IV-IV' line in FIG. 10.

FIG. 10 shows a top view of a capacitor housing in FIG. 8. FIG. 11 shows a cross-sectional view taken along a IV-IV' line in FIG. 10.

Referring to FIG. 10 and FIG. 11, the first internal electrode OE1 may include a first electrode portion BE extending on and along the bottom portion 420 of the capacitor housing 402, a second electrode portion WE extending on and along a side portion 410 of the capacitor housing 402 and coupled to the first electrode portion BE. That is, the second electrode portion WE of the first internal electrode OE1 may directly contact the first and third connection electrodes CE1, CE3. The first electrode portion BE may be coupled to the first external terminal SE1. For example, the first internal electrode OE1 may form a L-shape.

The first internal electrode OE1 and the second internal electrode OE2 may be formed in the capacitor housing 402 using an electrolyte or electroless plating.

Although not shown in the drawings, the second internal electrode OE2 may have the same configuration as the first internal electrode OE1. A second electrode portion (not shown) of the second internal electrode OE2 may contact the second and fourth connection electrodes CE2, CE4, and the first electrode portion (not shown) of the second internal electrode OE2 may be coupled to the second external terminal SE2.

Although, in FIG. 1 to FIG. 9, only the first to fourth connection electrodes CE1, CE2, CE3, CE4 are shown, more capacitor electrodes and dielectric layers may be stacked alternately before forming the final electrodes such as the fourth capacitor electrode 300 and fourth connection electrode CE4. In this connection, additional connection electrodes may be formed in addition to the first connection electrode CE1. In this connection, the additional connection electrodes may be further insulated from each other. Then, in one embodiment, the holes H1, H2 as shown in FIG. 1 and FIG. 3 may be formed. In another embodiment, the same configuration as the above configuration that each of the first to fourth connection electrodes of the multi-layer capacitor has an exposed side face without the housing may be achieved.

Further, although the four connection electrodes CE1, CE2, CE3, CE4 are divided into the tow group, the present disclosure is not limited thereto. For example, five or more capacitor electrodes and connection electrodes may form the multi-layer capacitor and may be divided into three or more groups.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:
1. A multi-layer capacitor package comprising:
   a multi-layer capacitor comprising at least two vertical alterations of capacitor electrodes and dielectric layers on a base substrate, the capacitor electrodes having substantially the same area;
   connection electrodes coupled to the capacitor electrodes respectively and extending from the capacitor electrodes respectively, wherein the connection electrodes are divided into at least two groups of the connection electrodes including first and second groups, wherein the connection electrodes in each group vertically overlap with each other, and the first and second groups are horizontally spaced from each other;
   a package housing configured to receive therein the multi-layer capacitor, wherein the package housing comprises a bottom portion and side portions coupled to the bottom portion; and
   first and second internal electrodes received in the package housing to be coupled to the first and second groups of the connection electrodes respectively, wherein the first and second internal electrodes are horizontally spaced from each other.

2. The package of claim 1, further comprising:
a first through-electrode passing through the first group of the connection electrodes, the first through-electrode having a bottom portion contacting the first internal electrode; and
a second through-electrode passing through the second group of the connection electrodes, the second through-electrode having a bottom portion contacting the second internal electrode.

3. The package of claim 2, wherein the connection electrodes in the first group of connection electrodes are insulated from each other via an insulating layer therebetween, and the connection electrodes in the second group of connection electrodes are insulated from each other via the insulating layer therebetween.

4. The package of claim 1, wherein each of the first internal electrode and the second internal electrode extends on and along the bottom portion of the package housing.

5. The package of claim 1, wherein each of the connection electrodes has an exposed outer side face, wherein the exposed outer side faces of the connection electrodes face the same inner side face of the package housing.

6. The package of claim 5, wherein the first internal electrode includes:
a first electrode portion contacting the exposed side face of the connection electrodes of the first group and extending on and along the side portion of the package housing; and
a second electrode portion coupled to the first electrode portion, and extending on and along the bottom portion of the package housing, and
wherein the second internal electrode includes:
a third electrode portion contacting the exposed side face of the connection electrodes of the second group and extending on and along the side portion of the package housing; and
a fourth electrode portion coupled to the third electrode portion, and extending on and along the bottom portion of the package housing.

7. The package of claim 1, further comprising:
a first external terminal coupled to the first internal electrode and passing through the bottom portion of the package housing outside of the housing; and
a second external terminal coupled to the second internal electrode and passing through the bottom portion of the package housing outside of the housing.

8. The package of claim 1, wherein each of the dielectric layers has an upper surface portion having pores formed therein, and each connection electrode is horizontally coupled to a corresponding capacitor electrode and to a dielectric layer immediately on the corresponding capacitor electrode.

9. A package housing for a multi-layer capacitor, the housing comprising:
a bottom portion;
side portions coupled to the bottom portion to define an inner space together with the bottom portion;
a first internal electrode formed in the inner space to contact the multi-layer capacitor; and
a second internal electrode formed in the inner space to contact the multi-layer capacitor, wherein the first internal electrode is spaced from the second internal electrode, wherein each of the first internal electrode and second internal electrode comprises:
a first electrode portion extending on and along the bottom portion; and
a second electrode portion coupled to the first electrode portion, the second electrode portion extending on and along the side portion.

* * * * *